(12) United States Patent  
Sakai et al.

(10) Patent No.: US 10,712,320 B2  
(45) Date of Patent: Jul. 14, 2020

(54) FLOW CHANNEL STRUCTURE AND MEASURING DEVICE FOR MEASUREMENT TARGET LIQUID

(71) Applicant: ALPS ALPINE CO., LTD., Tokyo (JP)

(72) Inventors: Osamu Sakai, Miyagi (JP); Yoshihiro Taguchi, Miyagi (JP); Kenichiro Sameshima, Miyagi (JP); Yoshimune Suzuki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 41 days.

(21) Appl. No.: 15/939,825

(22) Filed: Mar. 29, 2018

(65) Prior Publication Data

US 2018/0224408 A1 Aug. 9, 2018

Related U.S. Application Data

(63) Continuation of application No. PCT/JP2016/080226, filed on Oct. 12, 2016.

(30) Foreign Application Priority Data

Oct. 14, 2015 (JP) .................................. 2015-202518

(51) Int. Cl.
*G01N 30/74* (2006.01)
*G01N 37/00* (2006.01)
(Continued)

(52) U.S. Cl.
CPC ............. *G01N 30/74* (2013.01); *B01D 15/18* (2013.01); *G01N 21/031* (2013.01);
(Continued)

(58) Field of Classification Search
CPC ........ G01N 21/05; G01N 35/08; G01N 37/00; B01L 3/502753; B01L 3/502;
(Continued)

(56) References Cited

U.S. PATENT DOCUMENTS 3,307,113 A * 2/1967 Hughes ................. H01S 3/0606  
359/347  
5,285,310 A * 2/1994 Miller ..................... H01S 3/235  
359/338  
(Continued)

FOREIGN PATENT DOCUMENTS

JP H11-142386 5/1999  
JP 2003-121349 4/2003  
(Continued)

OTHER PUBLICATIONS

Espacenet English translation of Sato et al. ((JP 2008-43843).*  
(Continued)

*Primary Examiner* — Mohamed K Amara  
(74) *Attorney, Agent, or Firm* — IPUSA, PLLC

(57) ABSTRACT

A flow channel structure includes a substrate including a supply flow channel that guides a measurement target liquid toward inside; a separation element accommodating unit that accommodates a separation element that separates components included in the measurement target liquid; and a detection unit that guides the measurement target liquid passing through the separation element accommodating unit, wherein measuring light for measuring information about the components is to be irradiated onto the measurement target liquid. The detection unit includes a measurement flow channel part that guides the measurement target liquid, an incident part that is provided at an end of the measurement flow channel part and that guides the measuring light toward inside the measurement flow channel part, and an emission part that is provided at the other end of the measurement flow channel part and that derives the measuring light from the measurement flow channel part.

20 Claims, 12 Drawing Sheets

(51) Int. Cl.
G01N 27/447 (2006.01)
G01N 30/60 (2006.01)
G01N 21/03 (2006.01)
B01D 15/18 (2006.01)
G01N 30/14 (2006.01)
B01L 3/00 (2006.01)
G01N 30/38 (2006.01)
G01N 30/02 (2006.01)

(52) U.S. Cl.
CPC . *G01N 27/44721* (2013.01); *G01N 27/44791* (2013.01); *G01N 30/14* (2013.01); *G01N 30/6091* (2013.01); *G01N 30/6095* (2013.01); *G01N 37/00* (2013.01); *B01L 3/502715* (2013.01); *B01L 2300/168* (2013.01); *G01N 30/38* (2013.01); *G01N 2021/0314* (2013.01); *G01N 2030/027* (2013.01); *G01N 2030/746* (2013.01)

(58) Field of Classification Search
CPC ..... B01L 2300/0887; B01L 2300/0874; B01L 2200/0684; B01L 2300/0809; B01L 2300/0832; B01L 2300/0883; B01L 2300/14; B81B 1/00; B01J 19/00; B01D 15/16
See application file for complete search history.

(56) References Cited

U.S. PATENT DOCUMENTS

| | | | | |
|---|---|---|---|---|
| 5,418,880 | A * | 5/1995 | Lewis | G02B 5/04 359/625 |
| 5,533,163 | A * | 7/1996 | Muendel | G02B 6/03605 385/126 |
| 5,553,088 | A * | 9/1996 | Brauch | H01S 3/042 372/34 |
| 5,599,503 | A * | 2/1997 | Manz | B01L 3/502715 204/452 |
| 5,619,522 | A * | 4/1997 | Dube | H01S 3/0941 372/34 |
| 6,094,297 | A * | 7/2000 | Injeyan | H01S 3/09415 359/345 |
| 6,111,096 | A * | 8/2000 | Laugharn, Jr. | B01L 3/5027 203/1 |
| 6,120,985 | A * | 9/2000 | Laugharn, Jr. | B01L 3/5027 435/1.3 |
| 6,222,872 | B1 * | 4/2001 | Beach | H01S 3/0606 372/101 |
| 6,370,297 | B1 * | 4/2002 | Hakimi | G02B 6/2852 359/341.1 |
| 6,839,140 | B1 * | 1/2005 | O'Keefe | G01N 21/31 356/436 |
| 6,873,639 | B2 * | 3/2005 | Zhang | H01S 3/109 372/69 |
| 7,130,321 | B2 * | 10/2006 | Spinelli | H01S 3/083 372/22 |
| 7,167,312 | B2 * | 1/2007 | Voss | G02B 27/0972 359/618 |
| 7,226,562 | B2 * | 6/2007 | Holl | B01F 5/0646 422/50 |
| 7,388,895 | B2 * | 6/2008 | Gong | H01S 3/0606 372/66 |
| 7,430,231 | B2 * | 9/2008 | Luo | H01S 3/025 372/10 |
| 7,535,938 | B2 * | 5/2009 | Luo | H01S 3/0627 372/21 |
| 7,767,447 | B2 * | 8/2010 | Breidenthal | B01F 11/0045 435/303.1 |
| 7,894,071 | B2 * | 2/2011 | Frese | G01N 21/05 356/440 |
| 8,268,625 | B2 | 9/2012 | Sugiyama et al. | |
| 8,323,564 | B2 * | 12/2012 | Padmanabhan | B01L 3/502715 422/502 |
| 9,409,175 | B2 * | 8/2016 | Tanaka | B01L 3/508 |
| 10,080,485 | B2 * | 9/2018 | Jang | A61B 1/00009 |
| 10,082,659 | B2 * | 9/2018 | Jang | G02B 5/0242 |
| 10,459,241 | B2 * | 10/2019 | Santori | G02B 21/362 |
| 2002/0037499 | A1 * | 3/2002 | Quake | B01F 5/0646 435/6.13 |
| 2004/0155309 | A1 | 8/2004 | Sorin et al. | |
| 2005/0000812 | A1 | 1/2005 | Couderc et al. | |
| 2005/0019814 | A1 * | 1/2005 | Laugharn, Jr. | B01L 3/502753 435/6.12 |
| 2005/0239210 | A1 * | 10/2005 | Iida | B01L 3/502715 436/164 |
| 2007/0254004 | A1 * | 11/2007 | Rosero | A61B 5/076 424/423 |
| 2007/0263046 | A1 | 11/2007 | Iwasa et al. | |
| 2007/0281288 | A1 * | 12/2007 | Belkin | B01L 3/502715 435/4 |
| 2008/0026373 | A1 * | 1/2008 | Rodionova | B01L 3/5027 435/6.18 |
| 2008/0038837 | A1 | 2/2008 | Satou et al. | |
| 2008/0220414 | A1 * | 9/2008 | Jensen | C12Q 1/04 435/6.11 |
| 2009/0161108 | A1 * | 6/2009 | Frese | B01L 3/5027 356/440 |
| 2010/0079760 | A1 | 4/2010 | Bernacki | |
| 2010/0141951 | A1 | 6/2010 | Ali et al. | |
| 2010/0291588 | A1 * | 11/2010 | McDevitt | B01L 3/502715 435/7.2 |
| 2013/0219999 | A1 * | 8/2013 | Casey | F04B 19/006 73/61.48 |
| 2013/0287646 | A1 * | 10/2013 | Kageyama | B01L 3/502738 422/502 |
| 2013/0309661 | A1 * | 11/2013 | Bornhop | G01N 33/53 435/6.1 |
| 2013/0337475 | A1 * | 12/2013 | Horii | G01N 33/54393 435/7.25 |
| 2015/0232942 | A1 * | 8/2015 | Abate | B01L 3/502784 506/9 |
| 2016/0069798 | A1 * | 3/2016 | Yokoyama | G01N 33/54373 435/288.3 |
| 2018/0011003 | A1 * | 1/2018 | Baum | G01N 21/31 |
| 2018/0224408 | A1 * | 8/2018 | Sakai | G01N 37/00 |
| 2019/0125316 | A1 * | 5/2019 | Tariyal | B01L 3/00 |

FOREIGN PATENT DOCUMENTS

| | | |
|---|---|---|
| JP | 2006-292636 | 10/2006 |
| JP | 2007-218838 | 8/2007 |
| JP | 2008-043843 | 2/2008 |
| JP | 2010-243269 | 10/2010 |
| JP | 2013-529780 | 7/2013 |
| WO | 2007/111282 | 10/2007 |

OTHER PUBLICATIONS

International Search Report dated Jan. 10, 2017 in PCT/JP2016/080226 filed on Oct. 12, 2016.
Kyung Won Ro et al: "Integrated Light Collimating System for Extended Optical-Path-Length Absorbance Detection in Microchip-Based Capillary Electrophoresis", Analytical Chemistry, vol. 77, No. 16, Jul. 12, 2005 (Jul. 12, 2005), pp. 5160-5166, XP055511934, US ISSN: 0003-2700, DOI: 10.1021/ac050420c.
Extended European Search Report for 16855417.8 dated Oct. 11, 2018.
Japanese Office Action for 2017-545211 dated Oct. 8, 2019.

* cited by examiner

FLOW CHANNEL STRUCTURE AND MEASURING DEVICE FOR MEASUREMENT TARGET LIQUID

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/080226 filed on Oct. 12, 2016, designating the U.S., which claims priority based on Japanese Patent Application No. 2015-202518 filed on Oct. 14, 2015. The entire contents of each of the foregoing applications are incorporated herein by reference.

BACKGROUND

Technical Field

The present disclosure relates to a flow channel structure to be used for a measuring device for a measurement target liquid, which can support POCT; and a measuring device for a measurement target liquid in which a flow channel structure is embedded.

Description of Related Art

When measurement is to be performed to obtain information about a composition of a measurement target liquid, for example, a high performance liquid chromatography (HPLC: High Performance Liquid chromatography) device is used.

As for the HPLC device, Patent Document 1 (WO 2007/111282) discloses a HPLC device including an eluent bottle; a deaerator; a sample preparation unit; an analysis unit; a photometric system; and an operational circuit. The photometric system described in Patent Document 1 includes a photometry cell; a light source; a beam splitter; a light receiving system for measurement; and a light receiving system for reference, and the photometric system described in Patent Document 1 is installed separately from the analysis unit provided with a column for analysis.

Recently, point-of-care testing (POCT: Point-of Care Testing) is spreading, which implies simple/quick testing performed by a medical staff at a medical/nursing site. From a perspective of achieving POCT, the HPLC device may preferably be small in size.

SUMMARY

According to an aspect of the present disclosure, there is provided a flow channel structure that includes a substrate including a supply flow channel that guides a measurement target liquid toward inside; a separation element accommodating unit that accommodates a separation element that separates a plurality of components included in the measurement target liquid, the measurement target liquid being guided by the supply flow channel; and a detection unit that guides the measurement target liquid that passes through the separation element accommodating unit, wherein measuring light for measuring information about the plurality of components is to be irradiated onto the measurement target liquid, wherein the detection unit includes a measurement flow channel part that guides the measurement target liquid, an incident part that is provided at an end of the measurement flow channel part and that guides the measuring light toward inside the measurement flow channel part, and an emission part that is provided at the other end of the measurement flow channel part and that derives the measuring light from the measurement flow channel part.

According to another aspect of the present disclosure, there is provided a measuring device for a measurement target liquid including a flow channel structure; a liquid supply unit that supplies a developing solution to the flow channel structure; a sample injection unit that supplies the measurement target liquid to the flow channel structure; a light emitter that emits the measuring light for measuring the information about the plurality of components included in the measurement target liquid; and a detector including a photoreceiver that detects the measuring light irradiated onto the measurement target liquid, wherein the flow channel structure includes a substrate including a supply flow channel that guides a measurement target liquid toward inside; a separation element accommodating unit that accommodates a separation element that separates a plurality of components included in the measurement target liquid, the measurement target liquid being guided by the supply flow channel; and a detection unit that guides the measurement target liquid that passes through the separation element accommodating unit, wherein measuring light for measuring information about the plurality of components is to be irradiated onto the measurement target liquid, wherein the detection unit includes a measurement flow channel part that guides the measurement target liquid, an incident part that is provided at an end of the measurement flow channel part and that guides the measuring light toward inside the measurement flow channel part, and an emission part that is provided at the other end of the measurement flow channel part and that derives the measuring light from the measurement flow channel part.

DETAILED DESCRIPTION

Figure 1:
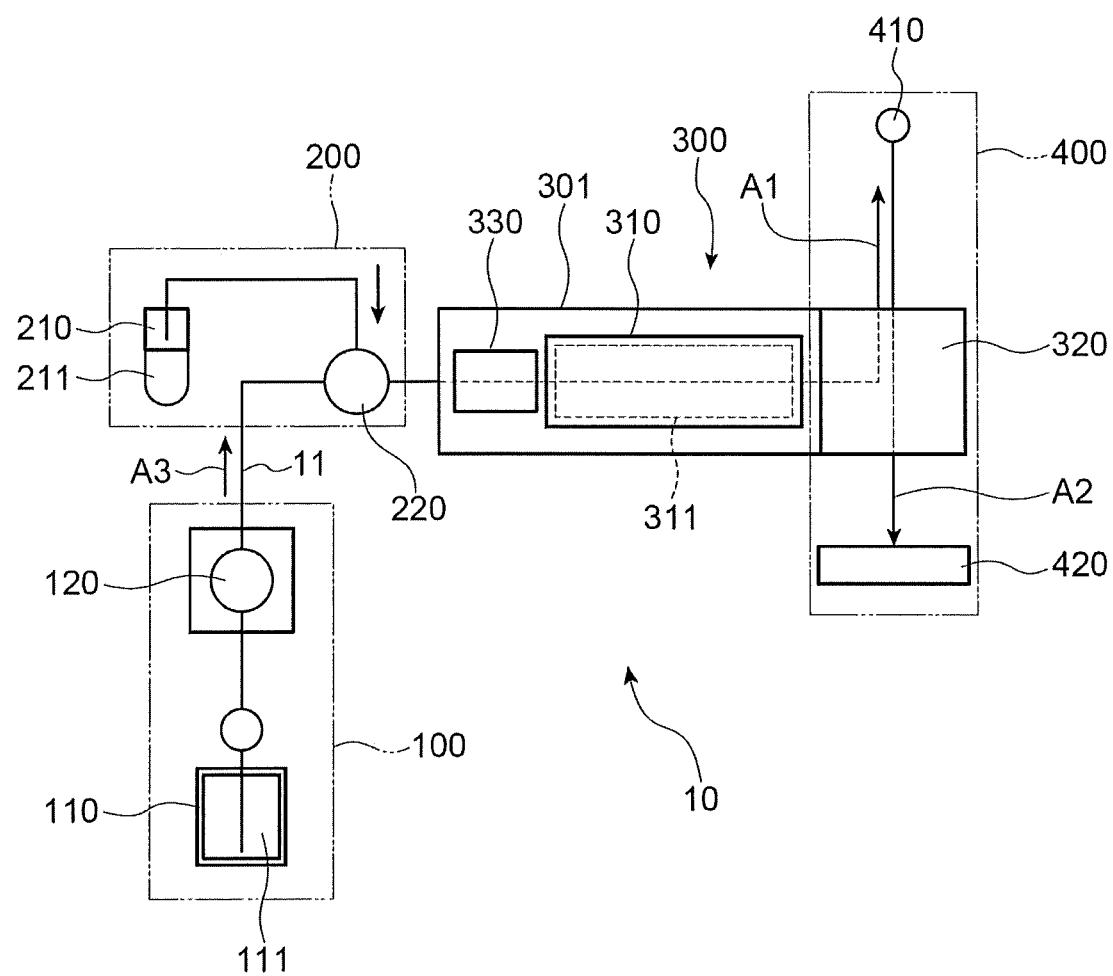
FIG. 1 is a block diagram representing a measuring device for a measurement target liquid including a flow channel structure according to an embodiment.

In the HPLC device described in Patent Document 1, the photometric system is installed separately from the analysis unit, so that it is difficult to reduce the size of the HPLC device. Additionally, in order to highly sensitively measure information about a composition of a measurement target liquid, it is necessary to minimize a volume of a flow channel for connecting the photometric system and the analysis unit. In this regard, in the HPLC device described in Patent Document 1, the photometric system is installed separately from the analysis unit, so that there is a limit for minimizing the volume of the flow channel for connecting the photometric system and the analysis unit.

Furthermore, depending on an assembled state of each functional unit installed as a separate assembly, a failure, such as liquid leakage, may occur inside the HPLC device. It is difficult to handle a failure, such as the liquid leakage, without technical knowledge. As a result, the HPLC device described in Patent Document 1 is not spread as the device directed to POCK, which is required to be handled by a general person without technical knowledge.

There is a need for a flow channel structure that facilitates to reduce a size of a measuring device in which the flow channel structure is embedded. Additionally, there is a need for a flow channel structure that facilitates the enhancement of high sensitivity of a measuring device in which the flow channel structure is embedded or that facilitates suppression of failure. Additionally, there is a need for a measuring device for a measurement target liquid, in which the flow channel structure is embedded.

According to the present disclosure, a flow channel structure can be provided that facilitates reduction in size of a measuring device in which the flow channel structure is embedded. Additionally, according to the present disclosure, the flow channel structure can be provided that facilitates to enhance high sensitivity of or to suppress a failure of the measuring device in which the flow channel structure is embedded. According to the present disclosure, the measuring device for a measurement target liquid can be provided in which the flow channel structure is embedded.

In the following, a flow channel structure and a measuring device for a measurement target liquid according to an embodiment of the present disclosure is described based on the drawings. Note that, in the following description, identical reference numerals are attached to identical components, and a description of a component, which is described once, is appropriately omitted.

Figure 2:
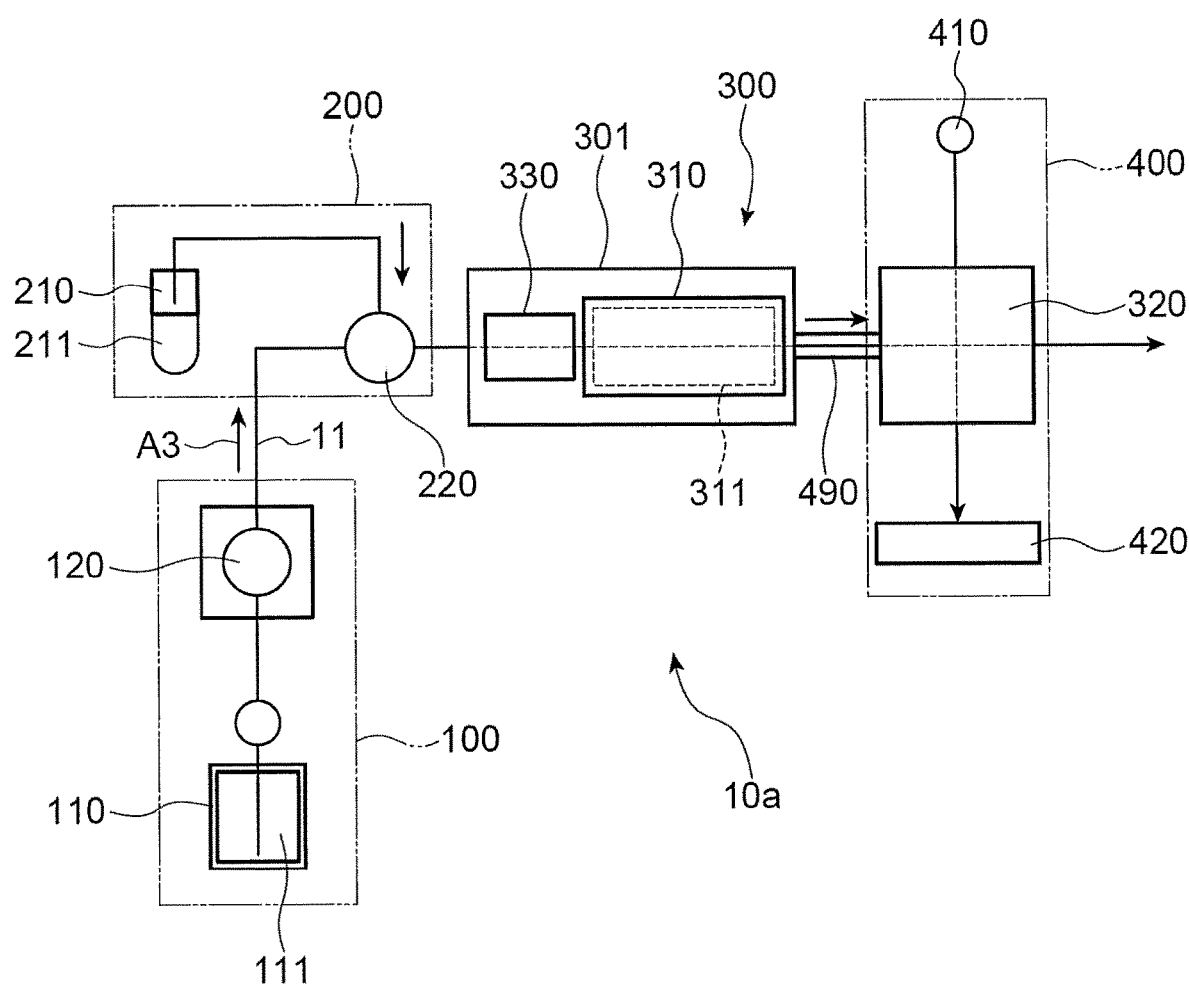
FIG. 2 is a block diagram representing a measuring device for a measurement target liquid including a flow channel structure according to a reference example.

FIG. 1 is a block diagram representing the measuring device for a measurement target liquid including the flow channel structure according to the embodiment. FIG. 2 is a block diagram representing a measuring device for a measurement target liquid including a flow channel structure according to a reference example.

As indicated in FIG. 1, the measuring device 10 for the measurement target liquid according to the embodiment includes a liquid supply unit 100; a sample injection unit 200; a flow channel structure 300; and a detector 400.

The liquid supply unit 100 includes a liquid reservoir 110; and a pump 120. The liquid reservoir 110 reserves a developing solution 111 as a mobile phase. The pump 120 provides a pressure fluctuation inside the liquid reservoir 110 so as to supply the developing solution 111 reserved in the liquid reservoir 110 to the flow channel structure 300.

The sample injection unit (injector) 200 includes a tank 210; and a valve 220. The tank 210 reserves a measurement target liquid (sample) 211. Upon the valve 220 being opened, the sample injection unit 200 supplies the measurement target liquid 211 reserved in the tank 210 to the flow channel structure 300, and the measurement target liquid 211 and the developing solution 111 supplied from the liquid reservoir 110 can be mixed.

The flow channel structure 300 includes a substrate 301. The substrate 301 includes a supply flow channel 330; and a separation element accommodating unit 310. The supply flow channel 330 guides the supplied measurement target liquid 211 toward inside the flow channel structure 300. The separation element accommodating unit 310 accommodates a separation element (separation column) 311. The separation element 311 separates respective components included in the measurement target liquid 211 using differences among interactions between the respective components included in the measurement target liquid 211 and the separation element 311. Specifically, for example, the separation element 311 separates respective components included in the measurement target liquid 211 using differences among traveling rates based on differences in adsorptivity or partition coefficients of respective components included in the measurement target liquid 211. For example, if the measurement target liquid 211 is blood, the separation element 311 separates components included in the blood, depending on a molecular size and a charged state. As the separation element 311, for example, silica monolith, etc., is used.

Note that the liquid reservoir 110 may be provided in the flow channel structure 300. In other words, the flow channel structure 300 may be provided with the liquid reservoir 110. In this case, the developing solution 111 reserved in the liquid reservoir 110 is supplied to the separation element accommodating unit 310 based on the pressure fluctuation provided inside the liquid reservoir 110 by the pump 120. When the liquid reservoir 110 is provided in the flow channel structure 300, the flow channel structure 300 is embedded in the measuring device 10 as a measurement unit provided with the developing solution 111 reserved in the liquid reservoir 110.

The detector 400 includes a light emitter 410; a detection unit 320; and a photoreceiver 420. The light emitter 410 is secured, for example, to a lid (not depicted), etc., of the flow channel structure 300, and the light emitter 410 emits measuring light toward the detection unit 320. The wavelength of the light emitted from the light emitter 410 is, for example, greater than or equal to approximately 250 nanometers (nm) and less than or equal to approximately 450 nm. However, the wavelength of the light emitted from the light emitter 410 is not limited to this.

The detection unit 320 is embedded in the flow channel structure 300 and integrally formed with the flow channel structure 300. In other words, the flow channel structure 300 includes the supply flow channel 330; the separation element accommodating unit 310; and the detection unit 320. In the measuring device 10 according to the embodiment, the detection unit 320 is a part of the flow channel structure 300, and the detection unit 320 is also a part of the detector 400. The detection unit 320 functions as a discharge flow channel for discharging a mixed liquid (the mixed liquid of the developing solution 111 and the measurement target liquid 211) that passes through the separation element 311; and the detection unit 320 also functions as a measurement flow channel for guiding the measurement target liquid 211, to which the measuring light emitted from the light emitter 410 is irradiated.

Specifically, the mixed liquid of the developing solution 111 and the measurement target liquid 211 passes through the separation element 311 and passes through the detection unit 320 to be discharged from the detection unit 320 after being separated into respective components, as the arrow A1 indicated in FIG. 1. At this time, the measuring light emitted from the light emitter 410 is irradiated onto the mixed liquid that passes through the detection unit 320. As the arrow A2 indicated in FIG. 1, at least a part of the measuring light irradiated onto the mixed liquid passes through the mixed liquid to enter the photoreceiver 420. The photoreceiver 420 detects the light that passes through the mixed liquid and calculates concentration of each component included in the measurement target liquid 211 based on the intensity of the detected light. The photoreceiver 420 may store the calculated concentration of each component.

Here, an example of a method of measuring the measurement target liquid according to the embodiment is described. First, as the arrow A3 indicated in FIG. 1, the pump 120 is driven to supply the developing solution 111 inside the liquid reservoir 110 to a supply flow channel 11, so as to fill the detection unit 320 with the developing solution 111. Subsequently, the valve 220 is opened to supply the measurement target liquid 211 inside the tank 210 to the flow channel structure 300. As a result, at a downstream side of the valve 220, a mixed liquid of the developing solution 111 and the measurement target liquid 211 is formed.

Then, the pump 120 is further driven to supply the developing solution 111 inside the liquid reservoir 110 to the supply flow channel 11, and the mixed liquid formed at the downstream side of the valve 220 is supplied to the separation element 311 so as to separate the measurement target liquid 211. Subsequently, measuring light emitted from the light emitter 410 is irradiated onto the mixed liquid that passes through the detection unit 320; and information about a composition of the measurement target liquid 211 is obtained by detecting the light that passes through the mixed liquid by the photoreceiver 420.

Here, the measuring device 10a according to the reference example is described, which is shown in FIG. 2. In the measuring device 10a according to the reference example indicated in FIG. 2, the detection unit 320 of the detector 400 is not embedded in the flow channel structure 300, and the detection unit 320 of the detector 400 is provided as a component different from the flow channel structure 300. In other words, the flow channel structure 300 does not include the detection unit 320. Accordingly, in the measuring device 10a according to the reference example, the detection unit 320 is not a part of the flow channel structure 300. The detection unit 320 is connected to the flow channel structure 300 through a tube 490.

Recently, point-of-care testing (POCT: Point-of Care Testing) is spreading, which implies simple/quick testing performed by a medical staff at a medical/nursing site. From a perspective of achieving POCT, the measuring device is preferably small in size.

In the measuring device 10a according to the reference example, which is indicated in FIG. 2, however, the detection unit 320 is provided as a component different from the flow channel structure 300. Thus, it is difficult to reduce the size the measuring device 10a. Further, in order to highly sensitively measure information about a composition of the measurement target liquid 211, a dead volume is required to be minimized. The reason is that, if the dead volume is large, the components of the measurement target liquid 211 separated in the separation element 311 are mixed again in the dead volume. Or, the measurement target liquid 211 diffuses in the dead volume. Note that, in the present specification, the "dead volume" is said to be a volume of a flow channel not related to separation of the measurement target liquid 211 out of the volume of the flow channel between the sample injection unit 200 and the detector 400.

Specifically, it is required to minimize the volume of the flow channel of the tube 490 connecting the flow channel structure 300 and the detection unit 320. However, in the measuring device 10a according to the reference example, which is indicated in FIG. 2, the detection unit 320 is provided as a component different from the flow channel structure 300. Thus, there is a limit for minimizing the volume of the flow channel of the tube 490.

In contrast, in the measuring device 10 according to the embodiment, which is indicated in FIG. 1, the detection unit 320 is embedded in the flow channel structure 300, and the detection unit 320 is integrally formed with the flow channel structure 300. As a result, the size of the measuring device 10 can be reduced, and the flow channel structure 300 can be provided that facilitates to reduce the size of the measuring device 10.

Furthermore, the volume of the flow channel for connecting the separation element accommodating unit 310 and the detection unit 320 can be minimized, as the detection unit 320 and the flow channel structure 300 are integrally formed. Namely, the dead volume can be minimized. As a result, the information about the composition of the measurement target liquid 211 can be highly sensitively measured. Namely, a theoretical plate number of a chromatogram can be increased.

Furthermore, unlike the measuring device 10a according to the reference example, which is indicated in FIG. 2, it is not necessary to connect the flow channel structure 300 and the detection unit 320 through the tube 490. As a result, a failure inside the measuring device 10, such as liquid leakage, can be suppressed from occurring. Furthermore, as the detection unit 320 is embedded in the flow channel structure 300, even if a failure related to the detection unit 320 occurs, the failure can be recovered by replacing the flow channel structure 300. As a result, POCT can be achieved.

Figure 3:
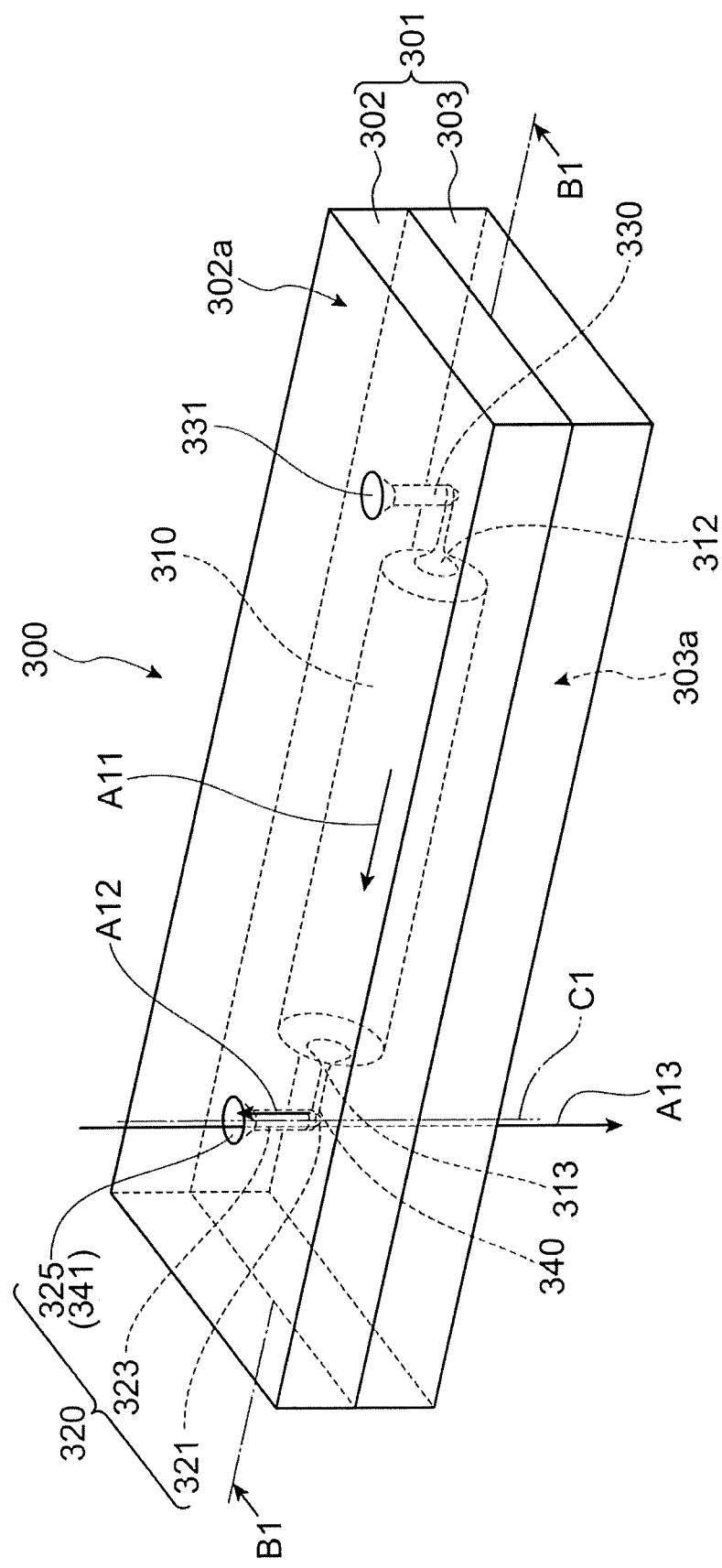
FIG. 3 is a schematic perspective view representing the flow channel structure according to the embodiment.
Figure 4:
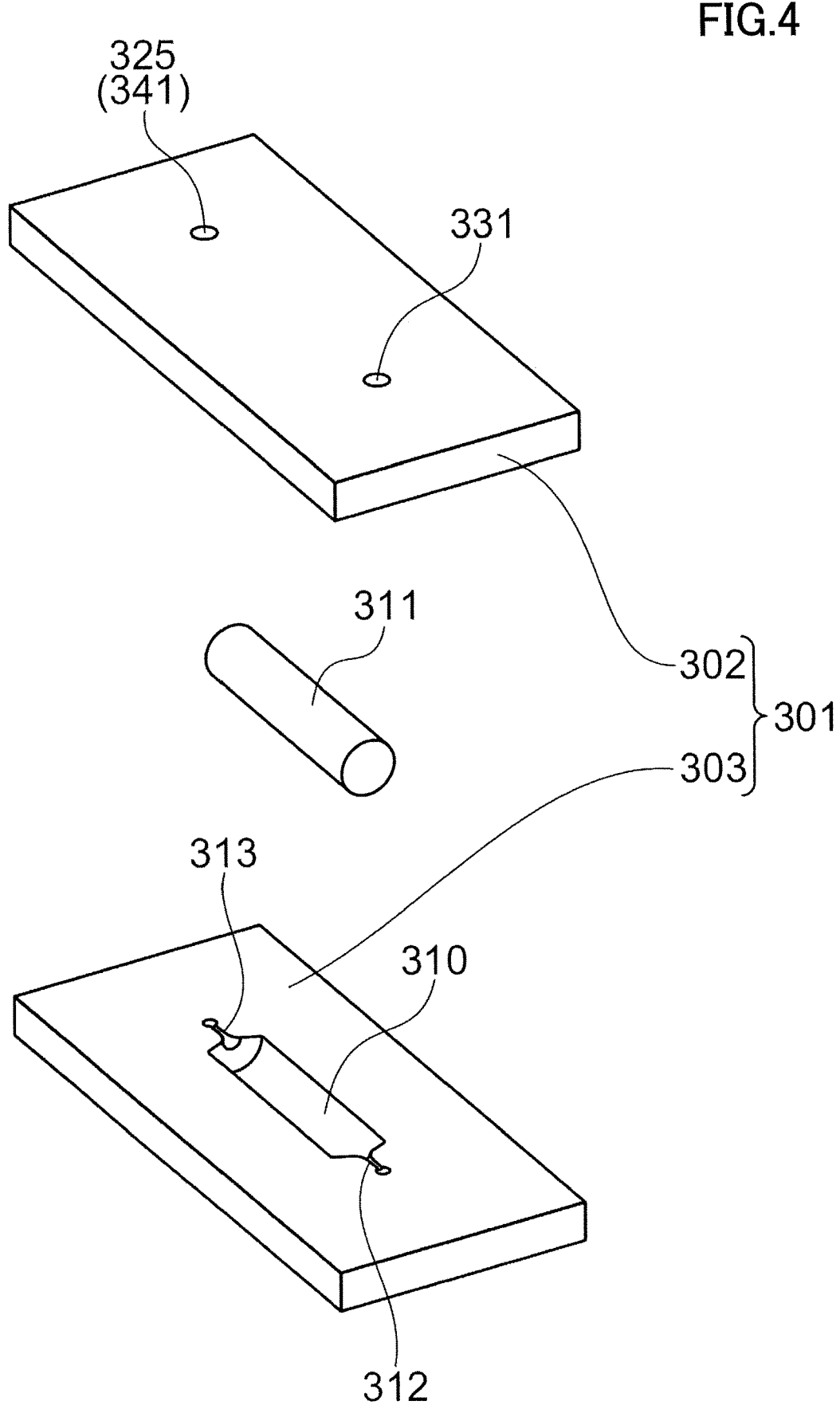
FIG. 4 is a schematic exploded view representing the flow channel structure according to the embodiment.
Figure 5:
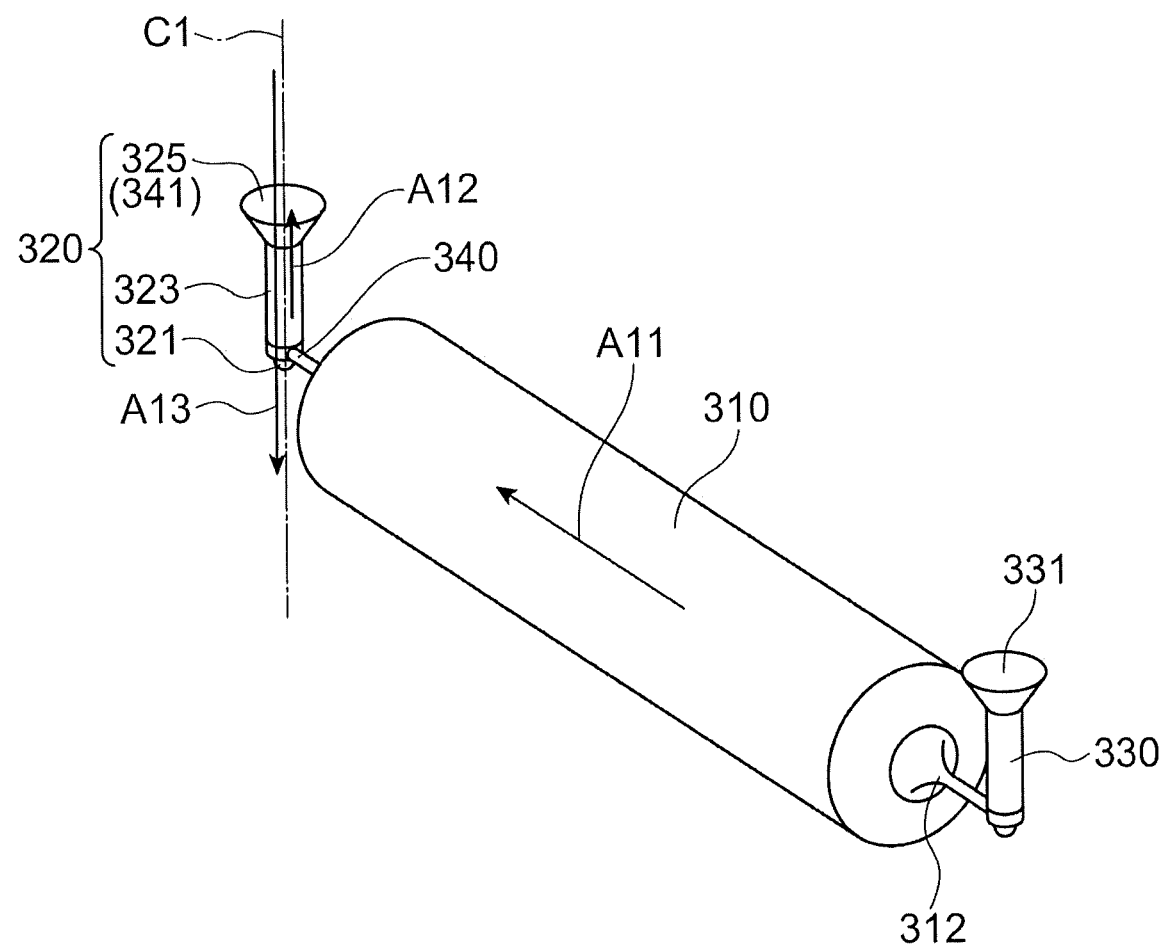
FIG. 5 is a schematic perspective view representing only a flow channel part of the flow channel structure according to the embodiment.
Figure 6:
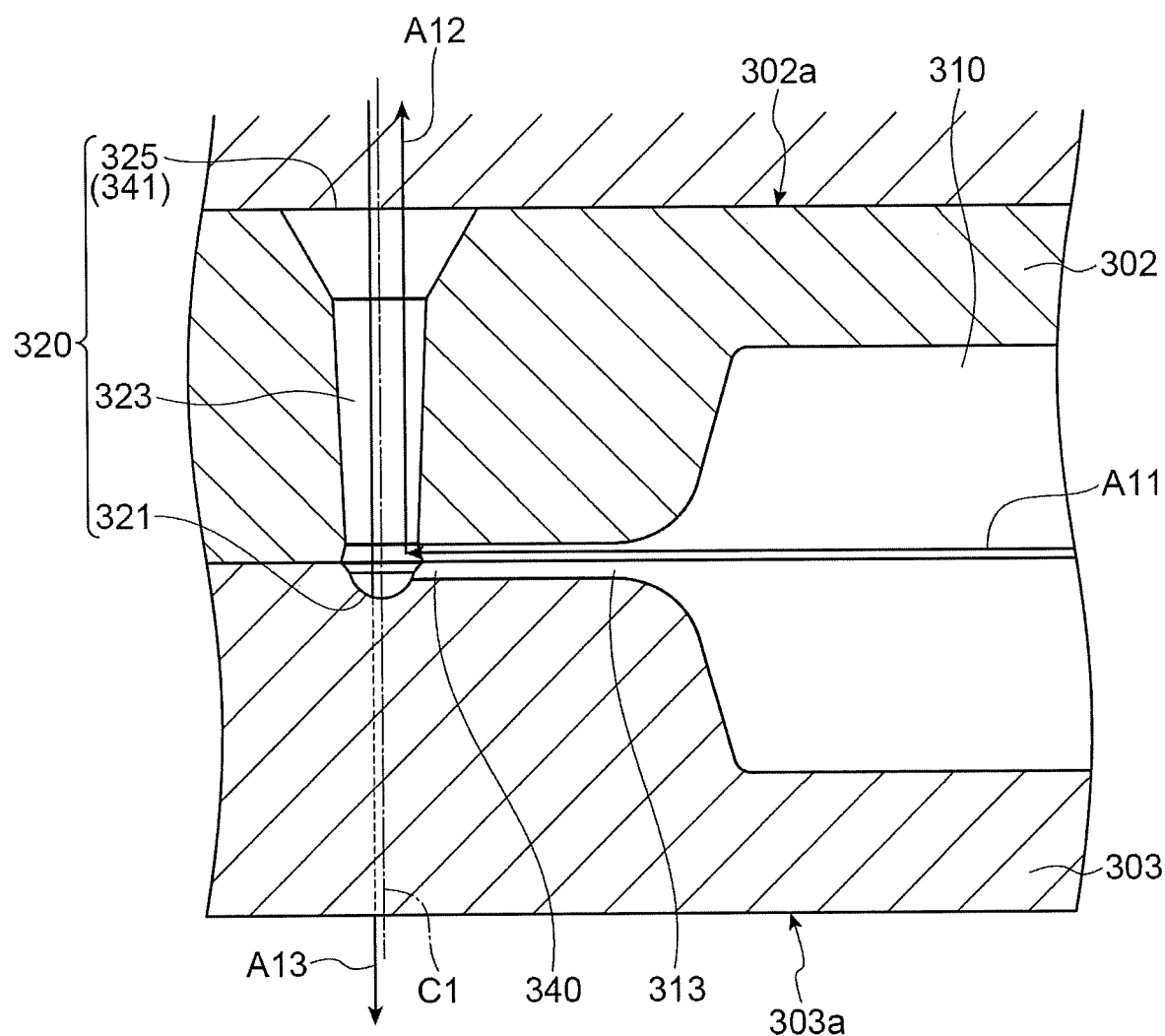
FIG. 6 is a schematic cross-sectional view on a section B1-B1 indicated in FIG. 3.

Next, a specific example of the flow channel structure according to the embodiment is described by referring to the drawings. FIG. 3 is a schematic perspective view representing the flow channel structure according to the embodiment. FIG. 4 is a schematic exploded view representing the flow channel structure according to the embodiment. FIG. 5 is a schematic perspective view representing only a flow channel part of the flow channel structure according to the embodiment. FIG. 6 is a schematic cross-sectional view on a section B1-B1 indicated in FIG. 3. FIG. 6 shows the vicinity of the detection unit 320, which is enlarged.

The flow channel structure 300 is provided with the substrate 301. The substrate 301 of the flow channel structure 300 according to the embodiment, which is shown in FIG. 3 and FIG. 4, is a laminated component of two plate-shaped parts 302 and 303, which are formed of a transparent material. Each of the two plate-shaped parts 302 and 303 is formed of the transparent material. In other words, any one of the two plate-shaped parts 302 and 303 has transparency in a wavelength range of the measuring light. As the transparent material, there are glass, an acrylic-based resin material, a cycloolefin-based resin material, a polyester-based resin material, etc. From perspectives of ease of manufacturing and broadness of the wavelength range, at least one of the two plate-shaped parts 302 and 303 may preferably be formed of a cycloolefin-based material, and it is more preferable that both the two plate-shaped parts 302 and 303 are formed of a cycloolefin-based material.

The flow channel structure 300 according to the embodiment is provided with the separation element accommodating unit 310; and the detection unit 320. Both ends of the separation element accommodating unit 310 are open ends 312 and 313. The separation element 311 is accommodated in the separation element accommodating unit 310 between the two open ends 312 and 313.

The flow channel structure 300 is provided with the supply flow channel 330. One end of the supply flow channel 330 is formed as an opening 331, and the other end of the supply flow channel 330 is connected to the open end 312 of the separation element accommodating unit 310. The supply flow channel 330 is connected to the supply flow channel 11 (cf. FIG. 1) of the measuring device 10 and guides, to the separation element 311, the developing solution 111 that is supplied through the supply flow channel 11 of the measuring device 10, the measurement target liquid 211, or the mixed liquid of the developing solution 111 and the measurement target liquid 211.

The flow channel structure 300 includes a discharge flow channel 340. One end of the discharge flow channel 340 is connected to the other open end 313 of the separation element accommodating unit 310; and the other end of the discharge flow channel 340 is formed as an opening 341. The discharge flow channel 340 ejects the developing solution 111, the measurement target liquid 211, or the mixed liquid of the developing solution 111 and the measurement target liquid 211, which passes through the separation element 311, to the outside the flow channel structure 300 through the opening 341.

The detection unit 320 includes a measurement flow channel part 323; an incident part 325; and an emission part 321, and the detection unit 320 forms a part of the discharge flow channel 340. In the discharge flow channel 40, the detection unit 320 is a part that has an axis C1 that intersects the traveling direction of the liquid flowing in the separation element accommodating unit 310 (the traveling direction of the liquid that passes through the separation element 311: the arrow A11). Namely, the axis C1 of the detection unit 320 intersects the traveling direction (the arrow A11) of the liquid flowing in the separation element accommodating unit 310. The axis C1 of the detection unit 320 corresponds to the axis C1 of the measurement flow channel part 323.

The measurement flow channel part 323 is a part that guides the measurement target liquid 211. The incident part 325 is provided at an end of the measurement flow channel part 323, and the incident part 325 is a part that guides the measuring light toward inside the measurement flow channel part 323. In the flow channel structure 300, the incident part 325 corresponds to the opening 341 of the discharge flow channel 340. The emission part 321 is provided at the other end of the measurement flow channel part 323, and the emission part 321 is a part that derives the measuring light from the measurement flow channel part 323. Specifically, the emission part 321 is provided at the end opposite to the incident part 325.

As shown in FIG. 6, in the flow channel structure 300 according to the embodiment, the traveling direction (flow direction) of the mixed liquid that flows in the measurement flow channel part 323 orthogonally intersects the traveling direction (the arrow A11) of the liquid flowing in the separation element accommodating unit 310 and extends in a plate thickness direction of the plate-shaped parts 302 and 303 (the direction orthogonal to main surfaces 302a and 303a of the plate-shaped parts 302 and 303).

As the arrow A11 and the arrow A12 indicated in FIG. 3, FIG. 5, and FIG. 6, the mixed liquid of the developing solution 111 and the measurement target liquid 211 passes through the separation element 311; and, after being separated into components, the mixed liquid of the developing solution 111 and the measurement target liquid 211 flows approximately along the axis C1 of the detection unit 320 and is ejected outside the flow channel structure 300. As the arrow A13 shown in FIG. 3, FIG. 5, and FIG. 6, a maximum directivity direction (the direction of the center line) of the measuring light emitted from the light emitter 410 is approximately along the axis C1 of the detection unit 320. Namely, an optical axis (the center line of the measuring light) of the light emitter 410 (cf. FIG. 1) extends in a direction along the traveling direction (the arrow A12) of the mixed liquid flowing in the measurement flow channel part 323 and is approximately parallel to the axis C1 of the detection unit 320.

As the arrow A13 shown in FIG. 6, at least a part of the measuring light irradiated onto the mixed liquid from the side of the incident part 325 passes through the mixed liquid; is guided from the emission part 321; and enters the photoreceiver 420 (cf. FIG. 1). The photoreceiver 420 detects the light that passes through the mixed liquid; and calculates the concentration of each component included in the measurement target liquid 211 based on the intensity of the detected light.

According to the embodiment, the detection unit 320 is embedded in the flow channel structure 300, which is formed as the laminated component of the two plate-shaped parts 302 and 303. As a result, the size of the measuring device 10 can be reduced, and the flow channel structure 300 can be provided that facilitates to reduce the size of the measuring device 10.

Furthermore, as the detection unit 320 is embedded in the flow channel structure 300, by using a part of the discharge flow channel 340 as the detection unit 320, the dead volume can be minimized. As a result, the information about the composition of the measurement target liquid 211 can be highly sensitively measured.

Furthermore, as the detection unit 320 is embedded in the flow channel structure 300, the volume of the flow channel connecting the separation element accommodating unit 310 and the detection unit 320 can be minimized. As a result, a failure inside the measuring device 10, such as liquid leakage, can be suppressed from occurring. Furthermore, even if a failure related to the detection unit 320 occurs, the failure can be recovered by replacing the flow channel structure 300. As a result, POCT can be achieved.

Furthermore, as the optical axis of the light emitter 410 extends in the direction along the traveling direction of the mixed liquid flowing in the detection unit 320, compared to a case in which the optical axis of the light emitter 410 intersects the traveling direction of the mixed liquid, the volume of a measurement region can be increased and an optical path length of the measuring light irradiated onto the mixed liquid can be extended. As a result, the photoreceiver 420 can easily detect a small change in absorbance, and the information about the composition of the measurement target liquid 211 can be highly sensitively measured.

Furthermore, as the axis C1 of the detection unit 320 extends in the plate thickness direction of the plate-shaped parts 302 and 303, the detection unit 320 can be relatively easily formed, and the axis C1 of the detection unit 320 can be relatively easily matched with the optical axis of the light emitter 410.

Figure 7:
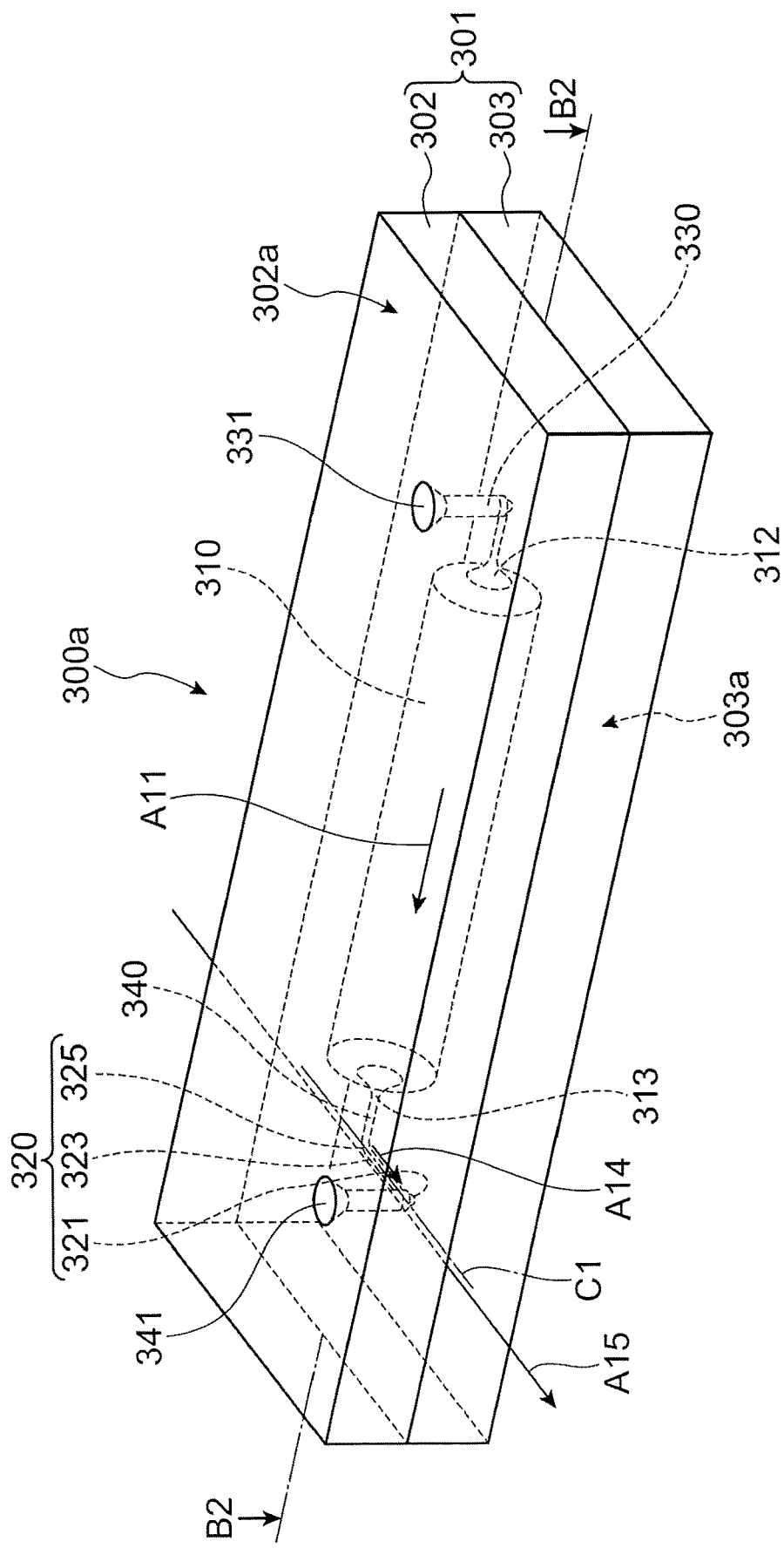
FIG. 7 is a schematic perspective view representing a flow channel structure according to another embodiment.
Figure 8:
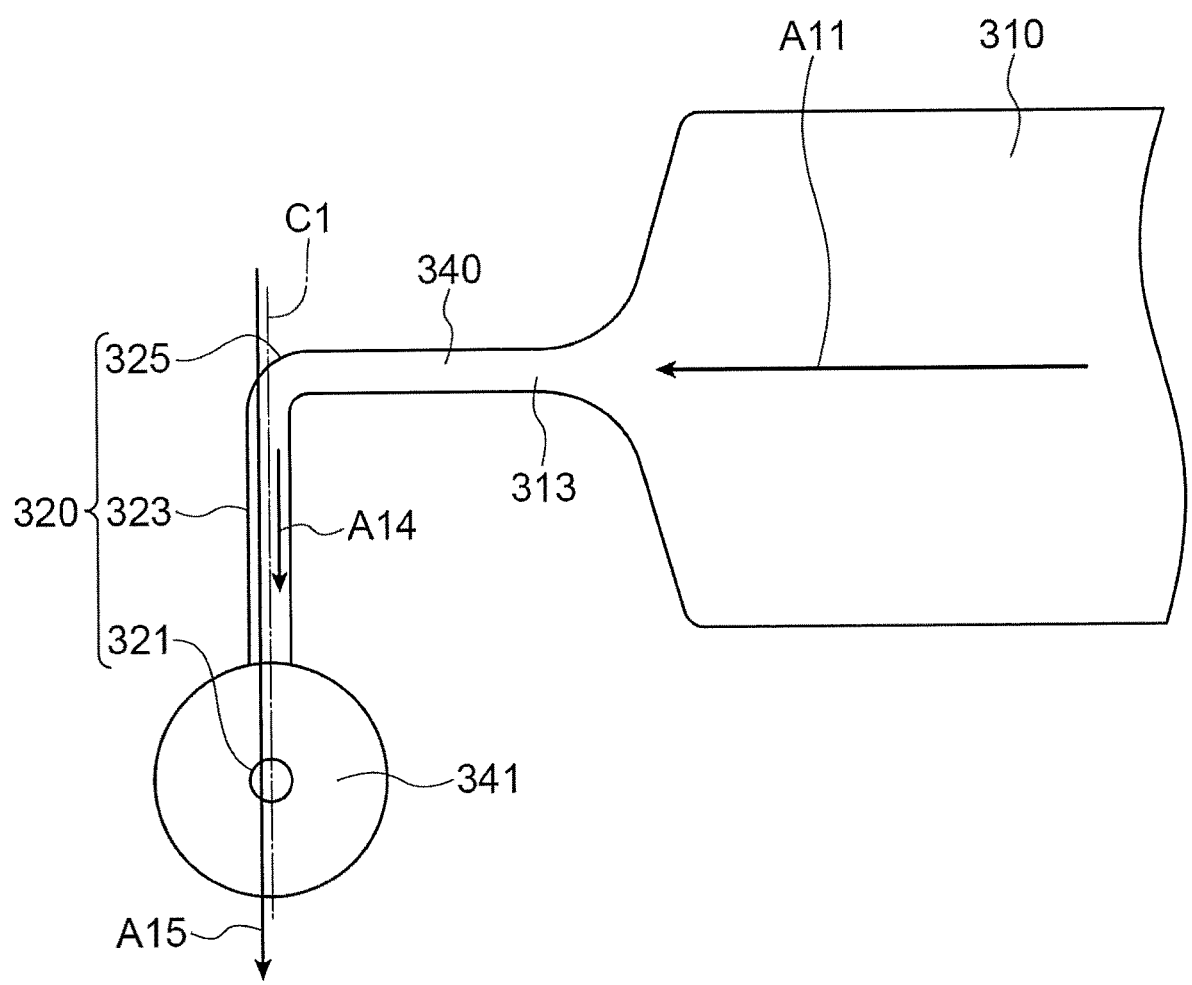
FIG. 8 is a schematic cross-sectional view on a section B2-B2 indicated in FIG. 7.

FIG. 7 is a schematic perspective view representing a flow channel structure according to another embodiment. FIG. 8 is a schematic cross-sectional view on a section B2-B2 indicated in FIG. 7. In FIG. 8, the vicinity of the detection unit 320 is shown, which is enlarged, and only the flow channel part is shown.

The flow channel structure 300a shown in FIG. 7 is provided with the separation element accommodating unit 310; and the detection unit 320. As shown in FIG. 8, the axis C1 of the detection unit 320 intersects the traveling direction (the arrow A11) of the liquid flowing in the separation element accommodating unit 310. Specifically, in the flow channel structure 300a according to the embodiment, the traveling direction of the mixed liquid flowing in the measurement flow channel part 323 orthogonally intersects the traveling direction (the arrow A11) of the liquid flowing in the separation element accommodating unit 310, and extends in the in-plane direction of the plate-shaped parts 302 and 303 (the direction parallel to the main surfaces 302a and 303a of the plate-shaped parts 302 and 303).

As the arrow A11 and the arrow A14 shown in FIG. 7 and FIG. 8, the mixed liquid of the developing solution 111 and the measurement target liquid 211 passes through the separation element 311; and, after being separated into the components, the mixed liquid flows approximately along the axis C1 of the detection unit 320. As the arrow A15 shown in FIG. 7 and FIG. 8, the maximum directivity direction of the measuring light emitted from the light emitter 410 is approximately along the axis C1 of the detection unit 320. Namely, the optical axis of the light emitter 410 extends in the direction along the traveling direction (the arrow A14) of the mixed liquid flowing in the measurement flow channel part 323, and the optical axis of the light emitter 410 is approximately parallel to the axis C1 of the detection unit 320. The other structures are the same as those of the flow channel structure 300 described above with reference to FIGS. 3 through 6.

According to the embodiment, even if the axis C1 of the detection unit 320 extends in the in-plane direction, instead of the plate thickness direction of the plate-shaped parts 302 and 303, the volume of the measurement region can be increased and the optical path length of the measuring light irradiated onto the mixed liquid can be extended because the optical axis of the light emitter 410 extends in the direction along the traveling direction of the mixed liquid flowing in the measurement flow channel part 323. As a result, the photoreceiver 420 can easily detect a small change in absorbance, and the information about the composition of the measurement target liquid 211 can be highly sensitively measured. Additionally, as the other effects, the effects can be obtained that are similar to the effects described above with reference to FIG. 3 through FIG. 6.

Figure 9:
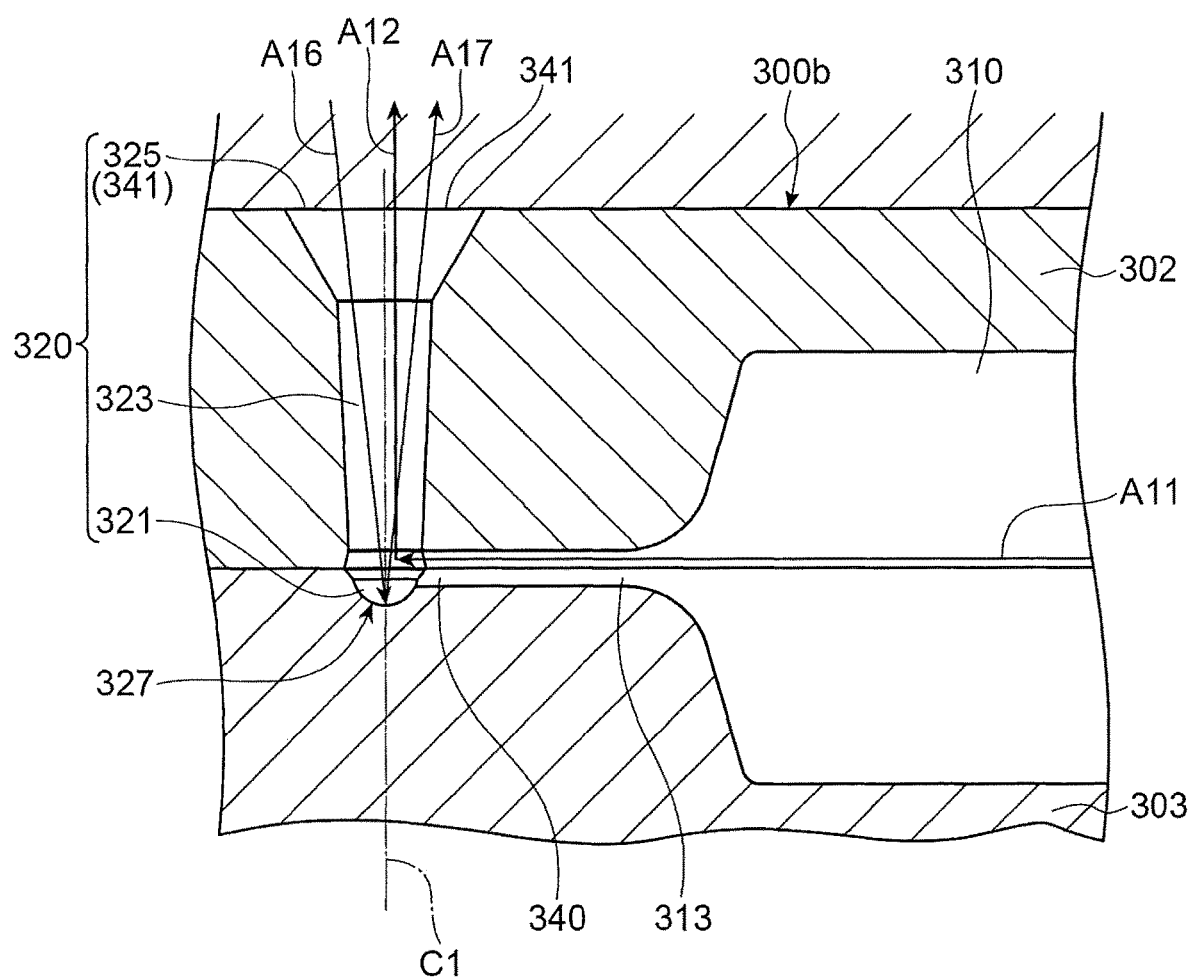
FIG. 9 is a schematic cross-sectional view representing a flow channel structure according to yet another embodiment.
Figure 10:
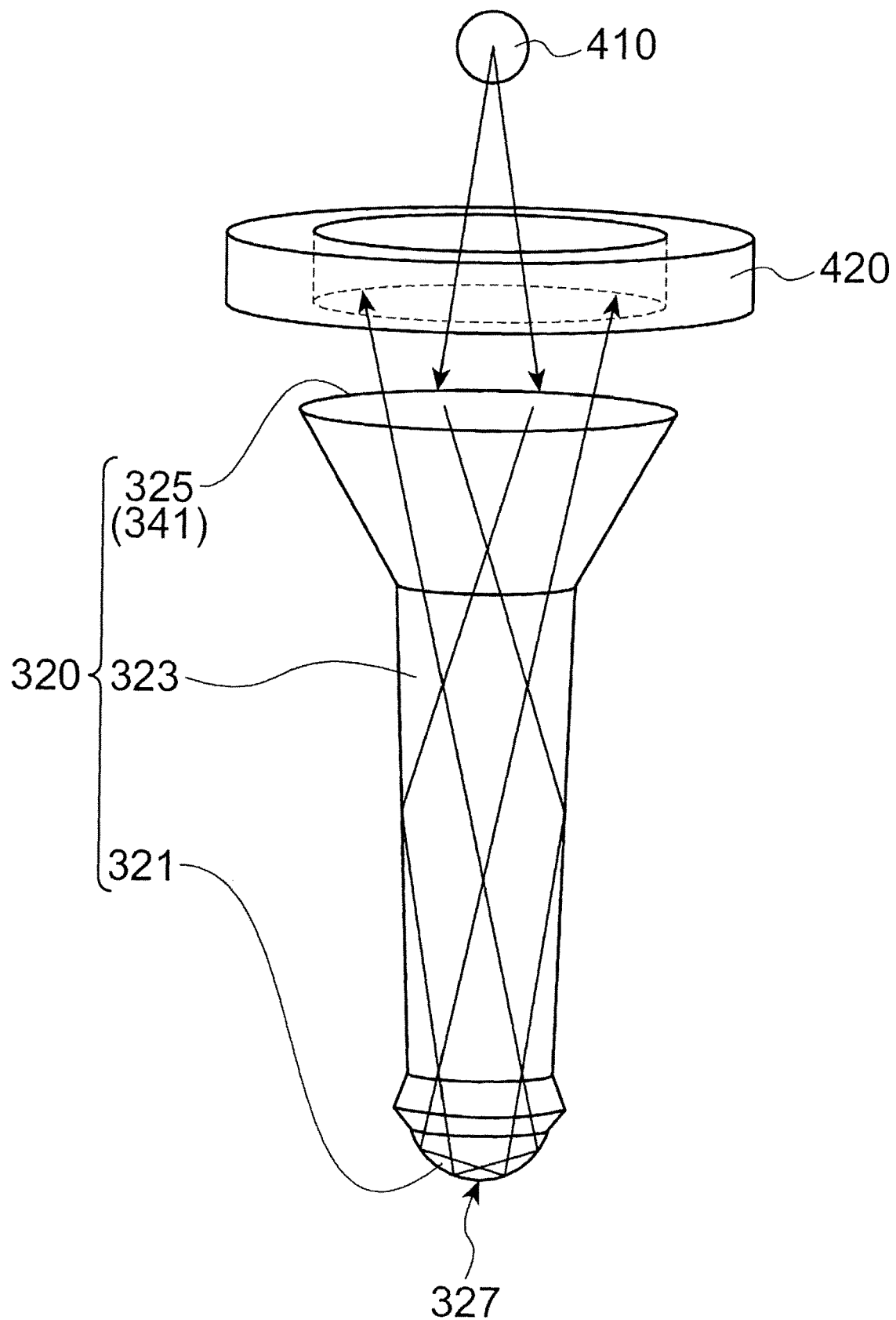
FIG. 10 is a schematic perspective view representing a vicinity of a detection unit according to the embodiment, which is enlarged.

FIG. 9 is a schematic cross-sectional view representing a flow channel structure according to yet another embodiment. FIG. 10 is a schematic perspective view representing a vicinity of a detection unit according to the embodiment, which is enlarged. FIG. 9 corresponds to a schematic cross-sectional view on the section B1-B1 indicated in FIG. 3. In FIG. 10, only the flow channel part is shown, out of the detection unit.

The flow channel structure 300b represented in FIG. 9 is provided with the separation element accommodating unit 310; and the detection unit 320. The traveling direction of the mixed liquid of the developing solution 111 and the measurement target liquid 211 is the same as the traveling direction (cf. the arrow A11 and the arrow A12) of the mixed liquid in the flow channel structure 300 described above with reference to FIG. 3 through FIG. 6.

However, the traveling direction of the measuring light emitted from the light emitter 410 is different from the traveling direction of the measuring light in the flow channel structure 300 described above with reference to FIG. 3 through FIG. 6 and in the flow channel structure 300a described above with reference to FIG. 7 and FIG. 8. Specifically, the emission part 321 of the detection unit 320 of the flow channel structure 300b according to the embodiment is provided with a reflection part 327. The reflection part 327 is formed at an end opposite to the incident part 325, and the reflection part 327 has a concave shape in the detection unit 320. The reflection part 327 may be formed in the plate-shaped part 302, or in the plate-shaped part 303. Alternatively, the reflection part 327 may be formed across the plate-shaped part 302 and the plate-shaped part 303.

As the arrow A16 and the arrow S17 in FIG. 9, the measuring light emitted from the light emitter 410 passes through the mixed liquid flowing in the measurement flow channel part 323 as diffused light, and, then, the measurement light is reflected on the reflection part 327 of the emission part 321 without passing through the plate-shaped part 303. Alternatively, as represented in FIG. 10, the measuring light emitted form the light emitter 410 passes through the mixed liquid flowing in the measurement flow channel part 323, and, then, the measuring light may be reflected several times on the reflection part 327 of the emission part 321 and the side surface of the measurement flow channel part 323. Namely, the reflection part 327 reflects the measuring light irradiated from the incident part 325 onto the mixed liquid. As described above, in the present specification, the "emission part" is not limited to the part for transmitting the measuring light to derive the measuring light from the measurement flow channel part 323, and the "emission part" includes the part that reflects the measuring light to derive the measuring light from the measurement flow channel part 323. As represented in FIG. 10, the measuring light that is reflected on the reflection part 327 of the emission part 321 passes through the incident part 325 and enters the photoreceiver 420.

As described above, in the measuring device in which the flow channel structure 300b according to the embodiment is embedded, when the photoreceiver 420 is viewed from the flow channel structure 300b, the photoreceiver 420 is not at the side opposite to the light emitter 410, and the photoreceiver 420 is provided at the same side as the light emitter 410. The photoreceiver 420 detects the light that passes through the mixed liquid and that is reflected on the reflection part 327, and the photoreceiver 420 calculates the concentration of each component included in the measurement target liquid 211 based on the intensity of the detected light. The other structures are the same as those of the flow channel structure 300 described above with reference to FIG. 3 through FIG. 6.

According to the embodiment, for example, even if the plate-shaped parts 302 and 303 are formed of a cycloolefin polymer resin and light in a wavelength range that does not pass through the cycloolefin polymer resin is used as the measuring light, reflection-based detection can be performed. Namely, the photoreceiver 420 is not affected by the wavelength range of the measuring light, and the photoreceiver 420 can detect the light reflected on the reflection part 327.

Further, compared to the transmission-based detection (cf. FIG. 3 through FIG. 8), the optical path length of the measuring light irradiated onto the mixed liquid can be extended. As a result, the photoreceiver 420 can easily detect a small change in absorbance, and the information about the composition of the measurement target liquid 211 can be highly sensitively measured. Further, by appropriately designing the shape of the mold for molding the plate-shaped parts 302 and 303, a suitable shape of the reflection part 327 can be manufactured. As a result, the photoreceiver 420 can stably detect the light.

The surface of the reflection part 327 may be provided with a layer including a metal, such as aluminum. The layer including a metal is formed, for example, by sputtering, vapor deposition, etc. In this case, as the reflection part 327 reflects a more amount of the measuring light, the photoreceiver 420 can highly sensitively measure the information about the composition of the measurement target liquid 211. Note that, when the measurement target liquid 211 is blood, the reflection part 327 may preferably include a layer including an oxide, such as silicon dioxide ($SiO_2$) on the layer including the metal. According to this, the layer including the oxide functions as a protection layer of the layer including the metal, and absorption of blood on the layer including the metal can be suppressed.

Figure 11:
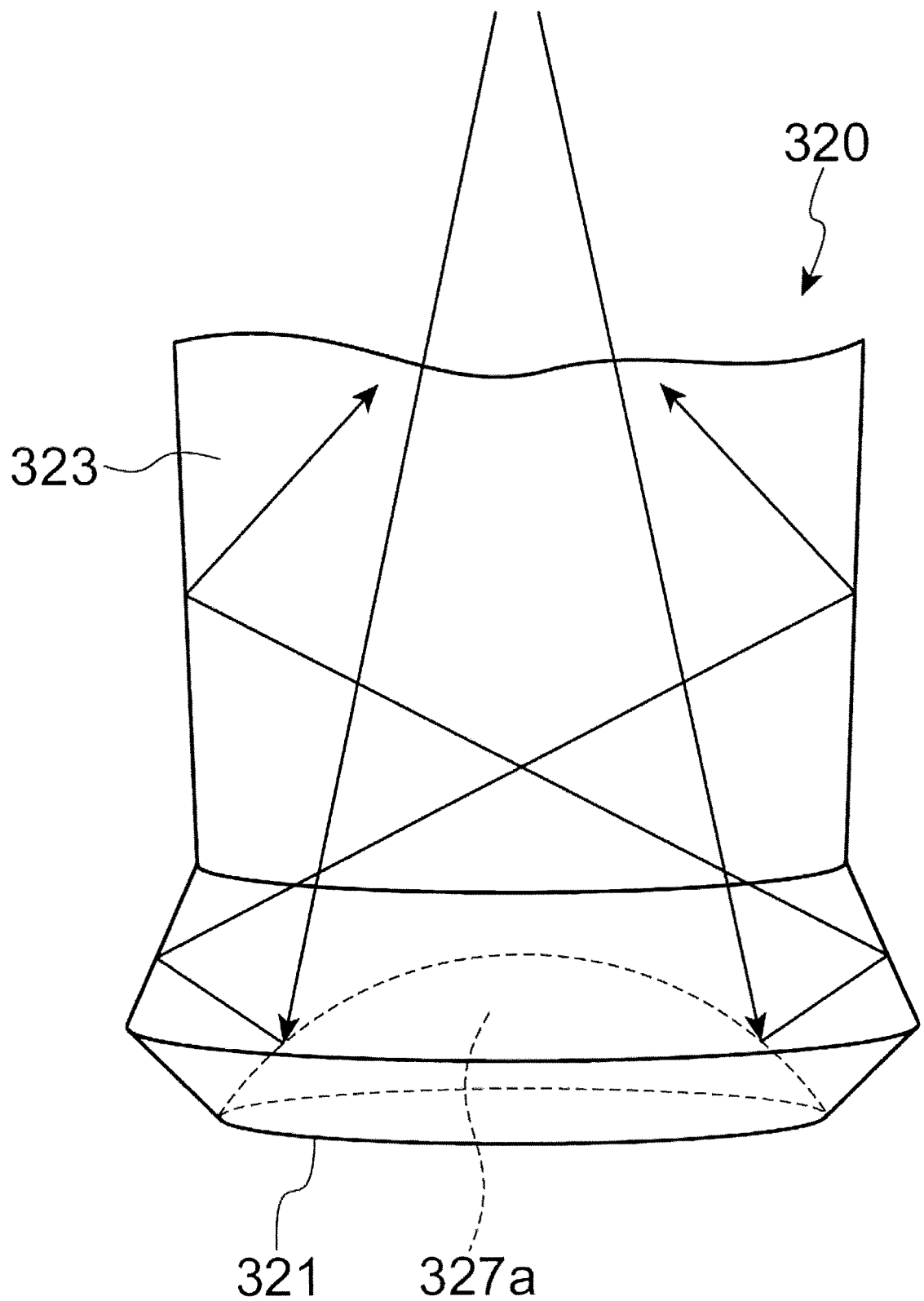
FIG. 11 is a schematic perspective view representing a modified example of a reflection part according to the embodiment.

FIG. 11 is a schematic perspective view representing a modified example of the reflection part according to the embodiment. In FIG. 11, the vicinity of the reflection part is shown, which is enlarged, and only the flow channel part is shown.

The emission part 321 of the detection unit 320, which is shown in FIG. 11, is provided with the reflection part 327a. The reflection part 327a according to the modified example is provided at an end opposite to the incident part 325 (cf. FIG. 6, for example), and the reflection part 327a has a concave shape protruding toward inside the detection unit 320. The reflection part 327a may be formed in the plate-shaped part 302, or may be formed in the plate-shaped part 303. Alternatively, the reflection part 327a may be formed across the plate-shaped part 302 and the plate-shaped part 303.

As represented in FIG. 11, the measuring light emitted from the light emitter 410 passes through the mixed liquid flowing in the measurement flow channel part 323, and, then, the measuring light is reflected on the reflection part 327a of the emission part 321 and on the side surface of the measurement flow channel part 323. In this modified example, a layer including a metal, such as aluminum, may preferably be formed on the side surface of the measurement flow channel part 323 by sputtering, vapor deposition, etc. The other structures are the same as the structures of the flow channel structure 300b described above with reference to FIG. 9 and FIG. 10.

According to this modified example, the measuring light reflected on the reflection part 327a having the convex shape diffuses inside the detection unit 320, so that the optical path length of the measuring light irradiated onto the mixed liquid can further be extended. As a result, the photoreceiver 420 can easily detect a small change in absorbance, and the information about the composition of the measurement target liquid 211 can be highly sensitively measured.

Figure 12:
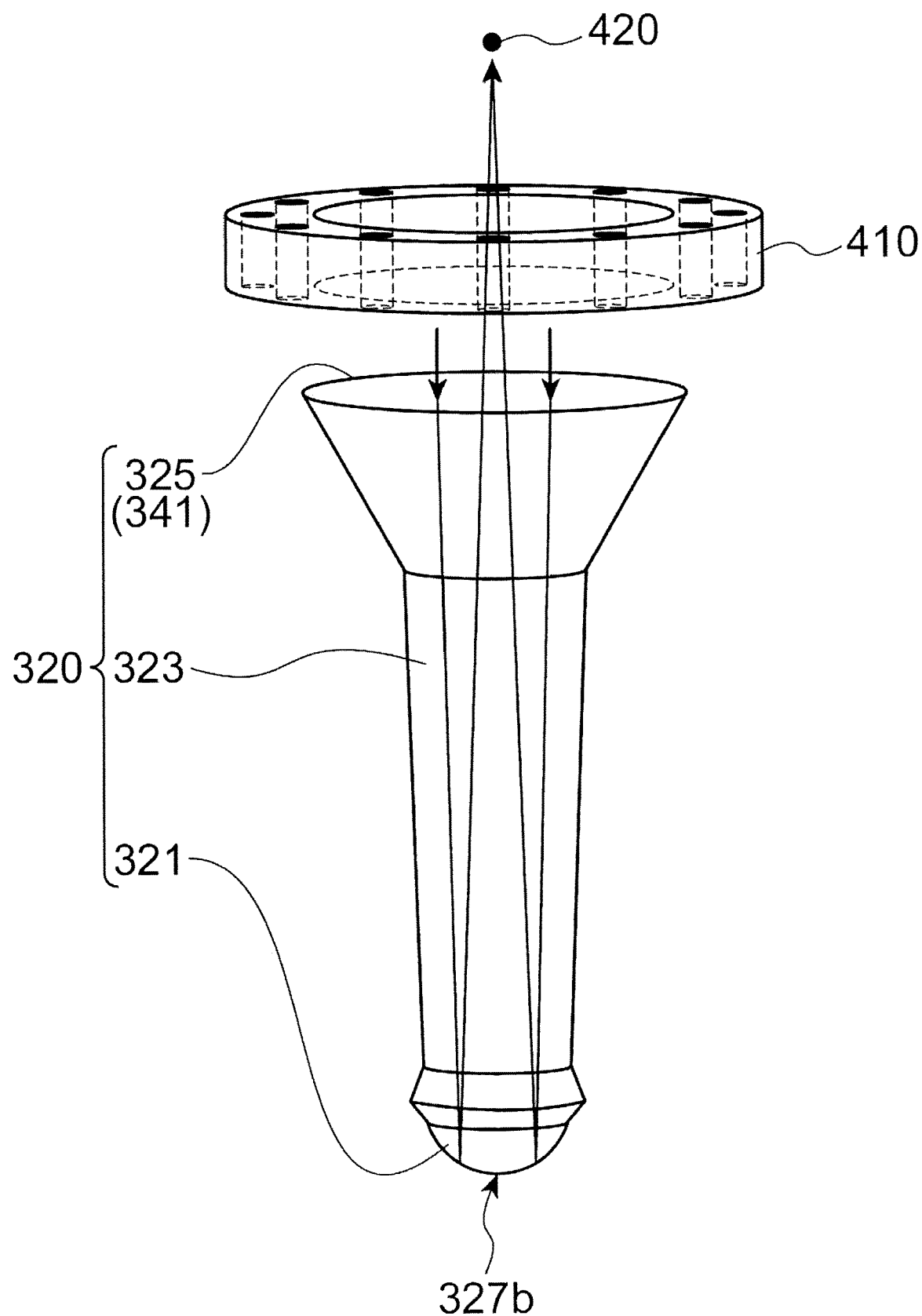
FIG. 12 is a schematic perspective view representing another modified example of the reflection part according to the embodiment.

FIG. 12 is a schematic perspective view representing another modified example of the reflection part according to the embodiment. In FIG. 12, only the flow channel part is shown, out of the detection unit.

The light emitter 410, which is described with reference to FIG. 9 and FIG. 10, emits the measuring light as the diffused light. In contrast, the light emitter 410 according to this modified example emits the measuring light as parallel light. The emission part 321 of the detection unit 320 represented in FIG. 12 is provided with the reflection part 327b. The reflection part 327b according to the modified example is provided at an end opposite to the incident part 325, and the reflection part 327b has a paraboloid. The surface of the reflection part 327b may be provided with a layer including a metal, such as aluminum. The layer including the metal is formed, for example, by sputtering, vapor deposition, etc.

The photoreceiver 420 is provided at the position of the focal point of the paraboloid of the reflection part 327b. According to this, the measuring light emitted from the light emitter 410 as the parallel light that is parallel to the axis of the paraboloid is reflected on the reflection part 327b, and, then the measuring light converges at the photoreceiver 420 provided at the position of the focal point of the paraboloid of the reflection part 327b. As a result, the photoreceiver 420 can highly sensitively measure the information about the composition of the measurement target liquid 211.

The specific configuration of the above-described measuring device may be appropriately configured depending on the configuration of the flow channel structure, the type of the measurement target liquid, etc. For example, as described with reference to FIG. 1, the liquid reservoir 110 of the liquid supply unit 100 may be provided in the flow channel structure 300.

<Conclusion>

According to the embodiment, there is provided a flow channel structure that includes a substrate including a supply flow channel that guides a measurement target liquid toward inside; a separation element accommodating unit that accommodates a separation element that separates a plurality of components included in the measurement target liquid, the measurement target liquid being guided by the supply flow channel; and a detection unit that guides the measurement target liquid that passes through the separation element accommodating unit, wherein measuring light for measuring information about the plurality of components is to be irradiated onto the measurement target liquid, wherein the detection unit includes a measurement flow channel part that guides the measurement target liquid, an incident part that is provided at an end of the measurement flow channel part and that guides the measuring light toward inside the measurement flow channel part, and an emission part that is provided at the other end of the measurement flow channel part and that derives the measuring light from the measurement flow channel part.

In the flow channel structure according to the embodiment of the present disclosure, the detection unit guides the measurement target liquid onto which the measuring light is irradiated that is for measuring the information about the components included in the measurement target liquid. Namely, the measuring light is irradiated onto the measurement target liquid flowing in the detection unit. The detection unit is embedded in the flow channel structure, and is integrally formed with the flow channel structure. As a result, the size of the measuring device in which the flow channel structure is embedded can be reduced, and the flow channel structure can be provided that facilitates to reduce the size of the measuring device.

Furthermore, as the detection unit is integrally formed with the flow channel structure, a volume of a flow channel connecting the separation element accommodating unit and the detection unit can be minimized. Namely, the dead volume can be minimized. As a result, the information about the composition of the measurement target liquid can be highly sensitively measured. Namely, a theoretical plate number of a chromatogram can further be increased.

Furthermore, as the detection unit is integrally formed with the flow channel structure, it is not necessary to connect the flow channel structure and the detection unit through a tube, etc. As a result, inside the measuring device in which the flow channel element is embedded, a failure, such as liquid leakage, can be suppressed from occurring. Furthermore, as the detection unit is integrally formed with the flow channel structure, even if a failure related to the detection unit occurs, the failure can be recovered by replacing the flow channel structure. Consequently, POCT can be achieved.

In the flow channel structure according to the embodiment, a center line of the measuring light may extend in a direction along a flow direction of the measurement target, liquid flowing in the measurement flow channel part. According to this, compared to a case in which the center line of the measuring light intersects the flow direction of the measurement target liquid flowing in the measurement flow channel part, the volume of the measurement region can be increased, and an optical path length of the measuring light irradiated onto the measurement target liquid can be extended. As a result, the measuring device in which the flow channel structure is embedded can easily detect a small change in absorbance, and the information about the composition of the measurement target liquid can be highly sensitively measured.

In the flow channel structure according to the embodiment, the flow direction of the measurement target liquid flowing in the measurement flow channel part may extend in a direction orthogonal to a main surface of the substrate. According to this, as the flow direction of the measurement target liquid flowing in the measurement flow channel part extends in a plate thickness direction, the detection unit can be relatively easily formed, and the flow direction of the measurement target liquid can be easily matched with the center line of the measuring light.

In the flow channel structure according to the embodiment, the flow direction of the measurement target liquid flowing in the measurement flow channel part may extend in a direction parallel to the main surface of the substrate. According to this, even if the flow direction of the measurement target liquid flowing in the measurement flow channel part extends in the in-plane direction of the substrate, instead of the plate thickness direction, by adjusting the center line of the measuring light and the flow direction of the measurement target liquid flowing in the measurement flow channel part to be parallel, the volume of the measurement region can be increased, and the optical path length of the measuring light irradiated onto the measurement target liquid can be extended. As a result, the measuring device in which the flow channel structure is embedded can easily detect a small change in absorbance, and the information about the composition of the measurement target liquid can be highly sensitively measured.

In the flow channel structure according to the embodiment, the emission part may include a reflection part that is provided at a position opposite to the incident part and that reflects the measuring light irradiated from the incident part onto the measurement target liquid. According to this, even if light in a wavelength range that does not pass through the substrate is used as the measuring light, reflection-based detection can be performed. Namely, the measuring device in which the flow channel structure is embedded can detect the light reflected on the reflection part, without being affected by the wavelength range of the measuring light. Further, compared to the transmission-based detection, the optical path length of the measuring light irradiated onto the measurement target liquid can be extended. As a result, the measuring device in which the flow channel structure is embedded can easily detect a small change in absorbance, and the information about the composition of the measurement target liquid can be highly sensitively measured.

In the flow channel structure according to the embodiment, the reflection part may have a concave shape in the detection unit. According to this, by appropriately designing the shape of the mold for forming the shape the substrate, a suitable shape of the reflection part can be manufactured. As a result, the measuring device in which the flow channel structure is embedded can stably detect the light.

In the flow channel structure according to the embodiment, the reflection part has a convex shape protruding toward inside the detection unit. According to this, the measuring light reflected on the reflection part having the convex shape diffuses inside the detection unit, so that the optical path length of the measuring light irradiated onto the measurement target liquid can further be extended. As a result, the measuring device in which the flow channel structure is embedded can easily detect a small change in absorbance, and the information about the composition of the measurement target liquid can be highly sensitively measured.

In the flow channel structure according to the embodiment, the reflection part may have a paraboloid. According to this, the measuring light emitted as parallel light that is parallel to the axis of the paraboloid of the reflection part is reflected on the reflection part, and, then, the measuring light converges at a position of the focal point of the paraboloid of the reflection part. As a result, when the photoreceiver that detects the light reflected on the reflection part is provided at the position of the focal point of the paraboloid of the reflection part, the photoreceiver can more highly sensitively measure the information about the composition of the measurement target liquid.

In the flow channel structure according to the embodiment, the reflection part may be provided with a layer including a metal formed on a surface of the substrate. According to this, the reflection part can reflect a more amount of the measuring light. As a result, the measuring device in which the flow channel structure is embedded can more highly sensitively measure the information about the composition of the measurement target liquid.

In the flow channel structure according to the embodiment, the reflection part may be provided with a layer including an oxide, wherein the layer including the oxide is formed on the layer including the metal. According to this, the layer including the oxide functions as a protection layer of the layer including the metal. Thus, even if the measurement target liquid is blood, absorption of the blood on the layer including the metal can be suppressed.

In the flow channel structure according to the embodiment, the substrate may be a laminated component of a plurality of plate-shaped parts. According to this, flow channel structures with various partial structures can be efficiently obtained.

In the flow channel structure according to the embodiment, each of the plurality of plate-shaped parts may have transparency with respect to a wavelength range of the measuring light.

In the flow channel structure according to the embodiment, the separation element may be a separation column.

In the flow channel structure according to the embodiment, the separation element may be an electrophoretic element.

According to the embodiment, there is provided a measuring device for a measurement target liquid including a flow channel structure; a liquid supply unit that supplies a developing solution to the flow channel structure; a sample injection unit that supplies the measurement target liquid to the flow channel structure; a light emitter that emits the measuring light for measuring the information about the plurality of components included in the measurement target liquid; and a detector including a photoreceiver that detects the measuring light irradiated onto the measurement target liquid, wherein the flow channel structure includes a substrate including a supply flow channel that guides a measurement target liquid toward inside; a separation element accommodating unit that accommodates a separation element that separates a plurality of components included in the measurement target liquid, the measurement target liquid being guided by the supply flow channel; and a detection unit that guides the measurement target liquid that passes through the separation element accommodating unit, wherein measuring light for measuring information about the plurality of components is to be irradiated onto the measurement target liquid, wherein the detection unit includes a measurement flow channel part that guides the measurement target liquid, an incident part that is provided at an end of the measurement flow channel part and that guides the measuring light toward inside the measurement flow channel part, and an emission part that is provided at the other end of the measurement flow channel part and that derives the measuring light from the measurement flow channel part.

In the measuring device for the measurement target liquid according to the embodiment, the detection unit guides the measurement target liquid onto which the measuring light is irradiated, which is for measuring the information about the components included in the measurement target liquid. Namely, the measuring light is irradiated onto the measurement target liquid flowing in the detection unit. The detection unit is embedded in the flow channel structure, and is integrally formed with the flow channel structure. As a result, the size of the measuring device in which the flow channel structure is embedded can be reduced.

Furthermore, as the detection unit is integrally formed with the flow channel structure, a volume of a flow channel connecting the separation element accommodating unit and the detection unit can be minimized. Namely, the dead volume can be minimized. As a result, the information about the composition of the measurement target liquid can be highly sensitively measured. Namely, a theoretical plate number of a chromatogram can further be increased.

Furthermore, as the detection unit is integrally famed with the flow channel structure, it is not necessary to connect the flow channel structure and the detection unit through a tube, etc. As a result, inside the measuring device in which the flow channel element is embedded, a failure, such as liquid leakage, can be suppressed from occurring. Furthermore, as the detection unit is integrally formed with the flow channel structure, even if a failure related to the detection unit occurs, the failure can be recovered by replacing the flow channel structure. Consequently, POCT can be achieved.

The flow channel structure and the measuring device for the measurement target liquid are described above by the embodiments. However, the present invention is not limited to the specifically disclosed embodiments, and variations and modifications may be made without departing from the scope of the present invention.

The separation element may be an electrophoretic element. In this case, the flow channel structure is provided with an electrode part inside the flow channel, and this electrode parts can be electrically connectable to the measuring device.

What is claimed is:

1. A flow channel structure comprising:
   a substrate including
      a supply flow channel that guides a measurement target liquid toward inside;
      a separation element accommodating space that accommodates a separation element that separates a plurality of components included in the measurement target liquid, the measurement target liquid being guided by the supply flow channel;
      a discharge flow channel that discharges the measurement target liquid that passes through the separation element accommodating space toward outside; and
      a detection unit that is formed in a part of the discharge flow channel and that guides the measurement target liquid,
   wherein measuring light for measuring information about the plurality of components is to be irradiated onto the detection unit,
   wherein the detection unit includes
      a measurement flow channel that guides the measurement target liquid,
      a light incident surface that is provided at a one end of the measurement flow channel and that guides the measuring light toward inside the measurement flow channel, and
      a light reflection surface that is provided at the other end of the measurement flow channel and that reflects the measuring light irradiated from the light incident surface, onto the measurement target,
      wherein a center line of the measuring light extends in a direction along a flow direction of the measurement target liquid flowing in the measurement flow channel and,
   wherein the measuring light that is guided at the light incident surface passes through inside the measurement flow channel and the measuring light that is reflected on the light reflection surface passes through inside the measurement flow channel again and passes through the light incident surface again.

2. The flow channel structure according to claim 1, wherein a center line of the measuring light extends in a direction along a flow direction of the measurement target liquid flowing in the measurement flow channel.

3. The flow channel structure according to claim 2, wherein the flow direction of the measurement target liquid flowing in the measurement flow channel extends in a direction orthogonal to a main surface of the substrate.

4. The flow channel structure according to claim 3, wherein the light reflection surface is provided with a layer including a metal, wherein the layer including the metal is formed on a surface of the substrate.

5. The flow channel structure according to claim 3, wherein the substrate is a laminated component of a plurality of plate-shaped parts.

6. The flow channel structure according to claim 5, wherein each of the plurality of plate-shaped parts has transparency with respect to a wavelength range of the measuring light.

7. The flow channel structure according to claim 3, wherein the separation element is a separation column.

8. The flow channel structure according to claim 3, wherein the separation element is an electrophoretic element.

9. The flow channel structure according to claim 2, wherein the flow direction of the measurement target liquid flowing in the measurement flow channel extends in a direction parallel to a main surface of the substrate.

10. The flow channel structure according to claim 1, wherein, in the detection unit, the light reflection surface has a concave shape.

11. The flow channel structure according to claim 1, wherein the light reflection surface has a convex shape protruding toward inside the detection unit.

12. The flow channel structure according to claim 1, wherein the light reflection surface has a paraboloid.

13. The flow channel structure according to claim 1, wherein the light reflection surface is provided with a layer including a metal, wherein the layer including the metal is formed on a surface of the substrate.

14. The flow channel structure according to claim 13, wherein the light reflection surface is provided with a layer including an oxide, wherein the layer including the oxide is formed on the layer including the metal.

15. The flow channel structure according to claim 1, wherein, the substrate is a laminated component of a plurality of plate-shaped parts.

16. The flow channel structure according to claim 15, wherein each of the plurality of plate-shaped parts has transparency with respect to a wavelength range of the measuring light.

17. The flow channel structure according to claim 1, wherein the separation element is a separation column.

18. The flow channel structure according to claim 1, wherein the separation element is an electrophoretic element.

19. A measuring device for a measurement target liquid comprising:
   a flow channel structure;
   a liquid supply unit that supplies a developing solution to the flow channel structure and
   a sample injector that supplies the measurement target liquid to the flow channel structure;
   wherein the flow channel structure includes
   a substrate including
      a supply flow channel that guides a measurement target liquid toward inside;
      a separation element accommodating space that accommodates a separation element that separates a plurality of components included in the measurement target liquid, the measurement target liquid being guided by the supply flow channel;
      a discharge flow channel that discharges the measurement target liquid that passes through the separation element accommodating space toward outside; and
      a detection unit that is formed at a part of the discharge flow channel and that guides the measurement target liquid,
   wherein measuring light for measuring information about the plurality of components is to be irradiated onto the detection unit,
   wherein the detection unit includes
      a measurement flow channel that guides the measurement target liquid,
      a light incident surface that is provided at one end of the measurement flow channel and that guides the measuring light toward inside the measurement flow channel, and
      a light reflection surface that is provided at the other end of the measurement flow channel and that reflects the measuring light irradiated from the light incident surface onto the measurement target liquid,
      wherein a center line of the measuring light extends in a direction along a flow direction of the measurement target liquid flowing in the measurement flow channel,
   wherein the measuring light that is guided at the light incident surface passes through inside the measurement flow channel and the measuring light that is reflected on the light reflection surface passes through inside the measurement flow channel again and passes through the light incident surface again, and
   wherein the measuring device further includes
      a light emitter that emits the measuring light for measuring the information about the plurality of components included in the measurement target liquid; and
      a detector including a photoreceiver that detects the measuring light irradiated onto the measurement target liquid.

20. The measuring device according to claim 19, wherein, with respect to the flow channel structure, the photoreceiver is provided at a side at which the light emitter is provided.

* * * * *